US011074657B1

(12) United States Patent
Osborne et al.

(10) Patent No.: US 11,074,657 B1
(45) Date of Patent: *Jul. 27, 2021

(54) TECHNIQUES TO VISUALIZE AND GAMIFY RISK MANAGEMENT SERVICES

(71) Applicant: United Services Automobile Association, San Antonio, TX (US)

(72) Inventors: Shane C. Osborne, Marion, TX (US); Jaime Fernandez, Jr., San Antonio, TX (US)

(73) Assignee: United Services Automobile Association ("USAA"), San Antonio, TX (US)

( * ) Notice: Subject to any disclaimer, the term of this patent is extended or adjusted under 35 U.S.C. 154(b) by 93 days.

This patent is subject to a terminal disclaimer.

(21) Appl. No.: 16/363,878

(22) Filed: Mar. 25, 2019

Related U.S. Application Data

(63) Continuation of application No. 14/663,137, filed on Mar. 19, 2015, now Pat. No. 10,282,786.

(Continued)

(51) Int. Cl.
*G06Q 40/08* (2012.01)
*A63F 13/65* (2014.01)
(Continued)

(52) U.S. Cl.
CPC .......... *G06Q 40/08* (2013.01); *A63F 13/537* (2014.09); *A63F 13/65* (2014.09); *A63F 13/822* (2014.09); *G09B 9/00* (2013.01)

(58) Field of Classification Search
CPC ..... G06Q 40/08; A63F 13/537; A63F 13/822; A63F 13/65; G09B 9/00
See application file for complete search history.

(56) References Cited

U.S. PATENT DOCUMENTS 8,744,890 B1 * 6/2014 Bernier ............ G06Q 10/06316
                                                                       705/7.16
8,909,541 B2 * 12/2014 Fairfax ............ G06Q 10/06315
                                                                       705/7.37

(Continued)

FOREIGN PATENT DOCUMENTS

| WO | WO-2013137943 A1 | 9/2013 | |
| WO | WO-2015117226 A1 | 8/2015 | |
| WO | WO-2015148491 A1 * | 10/2015 | .............. G06F 3/011 |

OTHER PUBLICATIONS udel.edu: Lab exercise: Monte Carlo simulation in an insurance pool, Mar. 31, 2012, pp. 1-2. (Year: 2012).*

(Continued)

*Primary Examiner* — Bijendra K Shrestha
(74) *Attorney, Agent, or Firm* — Locke Lord LLP; Christopher J. Capelli

(57) ABSTRACT

Techniques for gamifying risk management services include associating a financial status of a user with a defensible position display element in a gameplay scenario, receiving risk management data regarding at least one risk management service secured by the user, associating the risk management service with at least one defensive display element in the gameplay scenario, and providing the defensible position display element and each defensive display element to a display to cause the display to visualize the defensible position display element protected by each defensive display element in the gameplay scenario.

16 Claims, 6 Drawing Sheets

Related U.S. Application Data

(60) Provisional application No. 62/004,696, filed on May 29, 2014.

(51) Int. Cl.
    *A63F 13/822* (2014.01)
    *A63F 13/537* (2014.01)
    *G09B 9/00* (2006.01)

(56) References Cited

U.S. PATENT DOCUMENTS

| | | | |
|---|---|---|---|
| 9,292,874 B2* | 3/2016 | Beverina | G06Q 20/206 |
| 9,623,333 B2* | 4/2017 | Pattison | A63F 13/60 |
| 2014/0095211 A1* | 4/2014 | Gloerstad | G06Q 40/08 |
| | | | 705/4 |
| 2014/0195272 A1* | 7/2014 | Sadiq | G06Q 40/08 |
| | | | 705/4 |
| 2015/0141149 A1* | 5/2015 | Thomas | A63F 13/30 |
| | | | 463/42 |
| 2016/0027307 A1* | 1/2016 | Abhyanker | G06Q 50/01 |
| | | | 701/117 |
| 2017/0173466 A1* | 6/2017 | Fahmie | A63F 13/30 |

OTHER PUBLICATIONS

Jauri et al.: No Limits to using Monte Carlo for modelling, Jan. 23, 2013, pp. 1-5 (Year: 2013).*

Bajdor et al.: The Gamification as a tool to improve risk management in the enterprise, 2011, Annales Universitatis Apulensis Series Oeconomica, 13 (2), pp. 574-584 (Year: 2011).*

Jauri et al.: No limits on using Monte Carlo for modeling, Jan. 23, 2013, www.theactuary.com, pp. 1-5 (Year: 2013).*

Cognizant: Gamifying Business to Drive Employee Engagement and Performance, Sep. 2013, Cognizant Reports, pp. 1-10. (Year: 2013 (Year: 2013).*

Bajdor et al.: The Gamification as Tool to Improve Risk Management in the Enterprise, 2011, Annales Universitatis Apulensis Series Oeconomica, 13 (2), pp. 574-583. (Year: 2011).*

FinTech Futures: When Bank Plays Games, May 20, 2014, pp. 1-4 (Year: 2014).*

Cognizant: Gamifying Business to Drive Employee Engagement and Performance, Sep. 2013, Cognizant Reports, pp. 110. (Year: 2013).

* cited by examiner

400

START [405]

ASSOCIATE AN INITIAL FINANCIAL STATUS OF A USER (E.G., A NET WORTH, A TOTAL VALUE OF ASSETS, A FINANCIAL STOCK PORTFOLIO VALUE, A BANK ACCOUNT VALUE, A MORTGAGE VALUE, A DEBT VALUE, AN EMERGENCY FUND VALUE, A CREDIT VALUE, ETC.) WITH A DEFENSIBLE POSITION DISPLAY ELEMENT IN A GAMEPLAY SCENARIO (E.G., A HOUSE, A BUILDING, A STRUCTURE, A CASTLE, A FORTRESS, A FORTIFIED STRUCTURE, A STRUCTURE HAVING A SIZE CORRELATING TO THE FINANCIAL STATUS OF THE USER, ETC.) [410]

RECEIVE RISK MANAGEMENT DATA REGARDING AT LEAST ONE INITIAL RISK MANAGEMENT SERVICE (E.G., AN INSURANCE SERVICE, AUTOMOBILE INSURANCE, VEHICLE INSURANCE, HOME OWNERS INSURANCE, RENTAL INSURANCE, AN EMERGENCY FUND, HEALTH INSURANCE, LIFE INSURANCE, TERM INSURANCE, PROPERTY INSURANCE, UMBRELLA INSURANCE, ETC.) SECURED BY THE USER [415]

ASSOCIATE THE RISK MANAGEMENT SERVICE WITH AT LEAST ONE DEFENSIVE DISPLAY ELEMENT IN THE GAMEPLAY SCENARIO (E.G., A WALL, A BRIDGE, A MOAT, A BARRICADE, A BODY OF WATER, AN OBSTACLE, AND ONE OR MORE GUARDS, A TURRET, A DEFENSIVE WEAPON, A STRUCTURE THAT FORTIFIES AND/OR PROTECTS THE DEFENSIBLE POSITION DISPLAY ELEMENT, ETC.) [420]

PROVIDE THE DEFENSIBLE POSITION DISPLAY ELEMENT AND EACH DEFENSIVE DISPLAY ELEMENT TO A DISPLAY TO CAUSE THE DISPLAY TO VISUALIZE THE DEFENSIBLE POSITION DISPLAY ELEMENT PROTECTED BY EACH DEFENSIVE DISPLAY ELEMENT IN THE GAMEPLAY SCENARIO [425]

EVALUATE AT LEAST ONE NEGATIVE FINANCIAL SCENARIO (E.G., RESPONSIVE TO A REQUEST TO EXECUTE THE NEGATIVE FINANCIAL SCENARIO, A FIRE, AN AUTO ACCIDENT, A CAR REPAIR, A MEDICAL BILL, A NEWBORN, A DEATH, A LAWSUIT, LONG TERM CARE, A NATURAL DISASTER, ETC.) AGAINST THE INITIAL RISK MANAGEMENT SERVICE AND THE INITIAL FINANCIAL STATUS IN THE GAMEPLAY SCENARIO TO YIELD A RESULTANT RISK MANAGEMENT SERVICE AND A RESULTANT FINANCIAL STATUS, RESPECTIVELY [430]

MODIFY EACH DEFENSIVE DISPLAY ELEMENT BY THE RESULTANT RISK MANAGEMENT SERVICE TO YIELD AT LEAST ONE MODIFIED DEFENSIVE DISPLAY ELEMENT IN THE GAMEPLAY SCENARIO [435]

MODIFY THE DEFENSIBLE POSITION DISPLAY ELEMENT BY THE RESULTANT FINANCIAL STATUS TO YIELD A MODIFIED DEFENSIBLE POSITION DISPLAY ELEMENT IN THE GAMEPLAY SCENARIO [440]

PROVIDE EACH MODIFIED DEFENSIVE DISPLAY ELEMENT AND THE MODIFIED DEFENSIBLE POSITION DISPLAY ELEMENT TO THE DISPLAY TO CAUSE THE DISPLAY TO VISUALIZE EACH MODIFIED DEFENSIVE DISPLAY ELEMENT (E.G., IN A REDUCED PROTECTION STATE, IN A DAMAGED STATE, ETC.) AND THE DEFENSIBLE POSITION DISPLAY ELEMENT (E.G., IN A REDUCED PROTECTION STATE, IN A DAMAGED STATE, ETC.), RESPECTIVELY, IN THE GAMEPLAY SCENARIO [445]

END [450]

START [505]

ASSOCIATE AN INITIAL FINANCIAL STATUS OF A USER WITH A DEFENSIBLE POSITION DISPLAY ELEMENT IN A GAMEPLAY SCENARIO [510]

RECEIVE RISK MANAGEMENT DATA REGARDING AT LEAST ONE INITIAL RISK MANAGEMENT SERVICE SECURED BY THE USER [515]

ASSOCIATE THE RISK MANAGEMENT SERVICE WITH AT LEAST ONE DEFENSIVE DISPLAY ELEMENT IN THE GAMEPLAY SCENARIO [520]

EVALUATE AT LEAST ONE NEGATIVE FINANCIAL SCENARIO AGAINST THE INITIAL RISK MANAGEMENT SERVICE AND THE INITIAL FINANCIAL STATUS IN THE GAMEPLAY SCENARIO TO YIELD A RESULTANT RISK MANAGEMENT SERVICE AND A RESULTANT FINANCIAL STATUS, RESPECTIVELY [525]

DETERMINE A RISK MANAGEMENT CHANGE BETWEEN THE INITIAL RISK MANAGEMENT SERVICE AND THE RESULTANT RISK MANAGEMENT SERVICE [530]

DETERMINE A FINANCIAL STATUS CHANGE BETWEEN THE INITIAL FINANCIAL STATUS AND THE RESULTANT FINANCIAL STATUS [535]

ASSOCIATE THE RISK MANAGEMENT CHANGE AND THE FINANCIAL STATUS CHANGE WITH A GAME PLAY TIME PERIOD [540]

ITERATIVELY MODIFY EACH DEFENSIVE POSITION DISPLAY ELEMENT BY THE RISK MANAGEMENT CHANGE ACCORDING TO THE GAME PLAY TIME PERIOD [545]

ITERATIVELY MODIFY THE DEFENSIBLE POSITION DISPLAY ELEMENT BY THE FINANCIAL STATUS CHANGE ACCORDING TO THE GAME PLAY TIME PERIOD [550]

PROVIDE THE DEFENSIBLE POSITION DISPLAY ELEMENT AND EACH DEFENSIVE DISPLAY ELEMENT TO A DISPLAY TO CAUSE THE DISPLAY TO VISUALIZE THE DEFENSIBLE POSITION DISPLAY ELEMENT PROTECTED BY EACH DEFENSIVE DISPLAY ELEMENT IN THE GAMEPLAY SCENARIO [555]

END [560]

START [605]

ASSOCIATE AN INITIAL FINANCIAL STATUS OF A USER WITH A DEFENSIBLE POSITION DISPLAY ELEMENT IN A GAMEPLAY SCENARIO [610]

RECEIVE RISK MANAGEMENT DATA REGARDING AT LEAST ONE INITIAL RISK MANAGEMENT SERVICE SECURED BY THE USER [615]

ASSOCIATE THE RISK MANAGEMENT SERVICE WITH AT LEAST ONE DEFENSIVE DISPLAY ELEMENT IN THE GAMEPLAY SCENARIO [620]

PROVIDE THE DEFENSIBLE POSITION DISPLAY ELEMENT AND EACH DEFENSIVE DISPLAY ELEMENT TO A DISPLAY TO CAUSE THE DISPLAY TO VISUALIZE THE DEFENSIBLE POSITION DISPLAY ELEMENT PROTECTED BY EACH DEFENSIVE DISPLAY ELEMENT IN THE GAMEPLAY SCENARIO [625]

RECEIVE A REQUEST TO EXECUTE AT LEAST ONE NEGATIVE FINANCIAL SCENARIO IN THE GAMEPLAY SCENARIO [630]

DETERMINE MODIFICATIONS TO AT LEAST ONE OF THE DEFENSIBLE POSITION DISPLAY ELEMENT AND THE DEFENSIVE DISPLAY ELEMENT RESPONSIVE TO THE NEGATIVE FINANCIAL SCENARIO [635]

PROVIDE THE MODIFICATIONS TO THE DISPLAY TO CAUSE THE DISPLAY TO VISUALIZE AN ATTACK ON THE AT LEAST THE ONE OF THE DEFENSIBLE POSITION DISPLAY ELEMENT AND THE DEFENSIVE DISPLAY ELEMENT AND VISUALIZE THE MODIFICATIONS TO THE AT LEAST ONE OF THE DEFENSIBLE POSITION DISPLAY ELEMENT AND THE DEFENSIVE DISPLAY ELEMENT RESPONSIVE TO THE ATTACK [640]

END [645]

FIG. 6

TECHNIQUES TO VISUALIZE AND GAMIFY RISK MANAGEMENT SERVICES

CROSS REFERENCE TO RELATED APPLICATIONS

This application is a Continuation of U.S. patent application Ser. No. 14/663,137 filed Mar. 19, 2015, which is incorporated herein by reference in its entirety.

FIELD OF THE INVENTION

The present disclosure relates to risk management services, and more particularly, to visualizing and gamifying risk management services.

BACKGROUND OF THE INVENTION

Today, various types of risk management services (e.g., insurance services and the like) use a variety of platforms to reach an ever-increasing customer base. In particular, risk management services leverage the power and reach of networks such as the Internet and provide an environment to advertise, solicit, send information regarding various services, and otherwise provide access to manage risk management services for respective policy holders.

However, in leveraging the power and reach of networks, the environments created are often poorly designed, overly complex, and generally cumbersome to a user. For example, in certain instances, the environments are modeled to mimic traditional in-person brick and mortar experiences. Moreover, the next generation (and even some of the current generation) of prospective policy holders typically use the Internet (e.g., to communicate using social media, for entertainment such as applications, video games, etc., and the like) in significantly a different manner than traditional in-person communication (e.g., conventional brick and mortar establishments). Accordingly, modeling environments after traditional brick and mortar experiences often fails to relate or otherwise engage various policy holders.

Although attempts have been made to date to simplify the experience for existing and prospective policy holders, a need still remains for techniques that dynamically engage both existing policy holders and prospective policy holders and also balance relatable interfaces and visualizations. The present disclosure provides techniques that achieve these needs.

SUMMARY OF THE INVENTION

The present disclosure provides dynamically engaging environments and relatable interfaces and visualizations for risk management services to prospective and existing policy holders. Such techniques particularly visualize and gamify risk management services.

In one embodiment of the subject disclosure, a risk management services environment includes techniques for gamifying risk management services. In particular, a risk management server (e.g., server node(s) in a distributed processing system) associates an initial financial status of a user (e.g., a net worth, a total value of assets, a financial stock portfolio value, a bank account value, a mortgage value, a debt value, an emergency fund value, a credit value, etc.) with a defensible position display element in a gameplay scenario (e.g., a house, a building, a structure, a castle, a fortress, a fortified structure, a structure having a size correlating to the financial status of the user, etc.). The risk management server further receives risk management data regarding at least one initial risk management service (e.g., an insurance service, automobile insurance, vehicle insurance, home owners insurance, rental insurance, an emergency fund, health insurance, life insurance, term insurance, property insurance, umbrella insurance, etc.) secured by the user. The risk management server also associates the risk management service with at least one defensive display element in the gameplay scenario (e.g., a wall, a bridge, a moat, a barricade, a body of water, an obstacle, and one or more guards, a turret, a defensive weapon, a structure that fortifies and/or protects the defensible position display element, etc.) and provides the defensible position display element and each defensive display element to a display to cause the display to visualize the defensible position display element protected by each defensive display element in the gameplay scenario. The risk management server, in certain embodiments, receives a request to execute a financial impact scenario, which can include, for example, a fire, an auto accident, a car repair, a medical bill, a newborn, a death, a lawsuit, long term care, a natural disaster, and the like. Once received, the risk management server evaluates each one financial impact scenario against the initial risk management service and the initial financial status in the gameplay scenario to yield a resultant risk management service and a resultant financial status, respectively. The risk management server further modifies each defensive display element by the resultant risk management service to yield at least one modified defensive display element in the gameplay scenario and modifies the defensible position display element by the resultant financial status to yield a modified defensible position display element in the gameplay scenario. Each modified defensive display element and the modified defensible position display element is provided, by the risk management server, to a display to cause the display to visualize each modified defensive display element (e.g., in a reduced protection state, in a damaged state, etc.) and the defensible position display element (e.g., in a reduced protection state, in a damaged state, etc.), respectively, in the gameplay scenario.

In certain other embodiments, the risk management server also determines a risk management change between the initial risk management service and the resultant risk management service and determines a financial status change between the initial financial status and the resultant financial status. In these certain other embodiments, the risk management server associates the risk management change and the financial status change with a game play time period. The risk management server further iteratively modifies each defensive position display element by the risk management change according to the game play time period and iteratively modifies the defensible position display element by the financial status change according to the game play time period. Such iterative modifications are provided to the display to cause the display to visualize the defensible position display element and each defensive display element as modified during the gameplay scenario dynamically responsive to each one financial impact scenario. For example, the risk management server can determine modifications to each defensible position display element and the defensive display element and provide such modifications to the display to visualize an attack on the at least one of the defensible position display element and the defensive display element, and visualize the modifications to the at least one of the defensible position display element and the defensive display element responsive to the attack.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIGS. 4-6 illustrates example simplified procedures for gamifying risk management services, particularly from the perspective of a risk management system.

DESCRIPTION OF EXAMPLE EMBODIMENTS

As used herein, the term risk management includes insurance services and refers to contracts between an insurer, also known as a risk management an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, automotive and other insurance policies known by those skilled in the art such as (but not limited to): disability, life, medicare, critical care, retirement gap insurance, etc.

As used herein, the term "insurance policy" or "insurance" may encompass a warranty or other contract for the repair, service, or maintenance of insured property.

As used herein, "insured property" means a dwelling, other buildings or structures, personal property, or business property, as well as the premises on which these are located, some or all which may be covered by an insurance policy.

As discussed above, the subject disclosure provides a risk management environment that gamifies risk management services to current and prospective policy holders. As used herein, gamification refers to a design approach that applies or visualizes game mechanics to otherwise non-game scenarios. For example, certain reward cards or tokens of loyalty at coffee shops, by which you fill the card and/or earn rewards to receive a free cup of coffee represents one design approach to gamification.

With respect to risk management services, the subject disclosure provides a risk management environment using one or more servers (e.g., a distributed processing system) to better visualize a current financial status of a user as well as visualize risk management policies (either currently secured by the user or future potential policies) as protecting the financial status.

For purposes of discussion herein, the risk management environment is discussed with respect to a financial security fortress having a defensible position display element (corresponding to a financial status) as well as one or more defensive display elements (corresponding to risk management services) that protect the defensible position display element. However, the embodiments in their broader sense are not limited to any specific display elements, but can be employed using a variety of visual display elements that convey to a user the financial status as well as protection by one or more risk management services.

Figure 1:
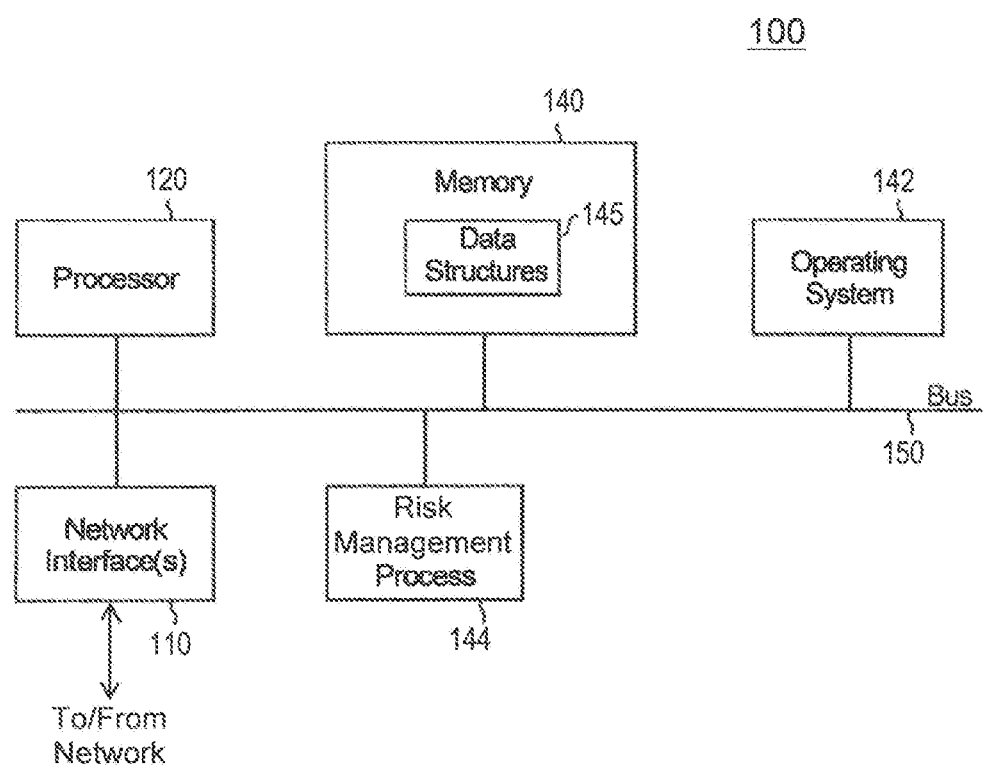
FIG. 1 illustrates an example risk management network device/server/node.

Referring now to FIG. 1, a schematic block diagram of an example risk management device/server 100 (e.g., a component which can be part of a larger server, distributed processing system, etc.) is shown. The device 100 comprises one or more network interfaces 110, at least one processor 120, and a memory 140 interconnected by a system bus 150. A component or a feature that is common to more than one drawing is indicated with the same reference number in each of the drawings.

The network interface(s) 110 contain the mechanical, electrical, and signaling circuitry for communicating data over physical and/or wireless links coupled to a network (e.g., the Internet). The network interfaces 110 are configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, etc.

The memory 140 comprises a plurality of storage locations that are addressable by the processor 120 and the network interfaces 110 for storing software programs and data structures associated with the embodiments described herein. As noted above, certain devices may have limited memory or no memory (e.g., no memory for storage other than for programs/processes operating on the device). The processor 120 may comprise necessary elements or logic adapted to execute the software programs and manipulate data structures 145, such as risk management data/services/ processes. An operating system 142, portions of which are typically resident in memory 240 and executed by the processor, functionally organizes the device by, inter alia, invoking operations in support of software processes and/or services executing on the device. These software processes and/or services may comprise risk management process/ services 144. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Risk management process (services) 144 contains computer executable instructions executed by the processor 120 to perform functions provided such as providing a risk management environment and/or interface with users to allow users to manage, secure, or otherwise visualize risk management services with respect to corresponding financial status.

Illustratively, the techniques described herein may be performed by hardware, software, and/or firmware, such as in accordance with the risk management process 144, which may contain computer executable instructions executed by the processor 120 (or independent processor of interfaces 110) to perform functions relating to the techniques described herein. Included devices include (but are not limited to): desktop and portable computers (e.g., laptops); tablet devices; smart phone devices (e.g., iOS and Android operating driven devices); game consoles (e.g., XBOX); and other suitable computing devices.

Figure 2:
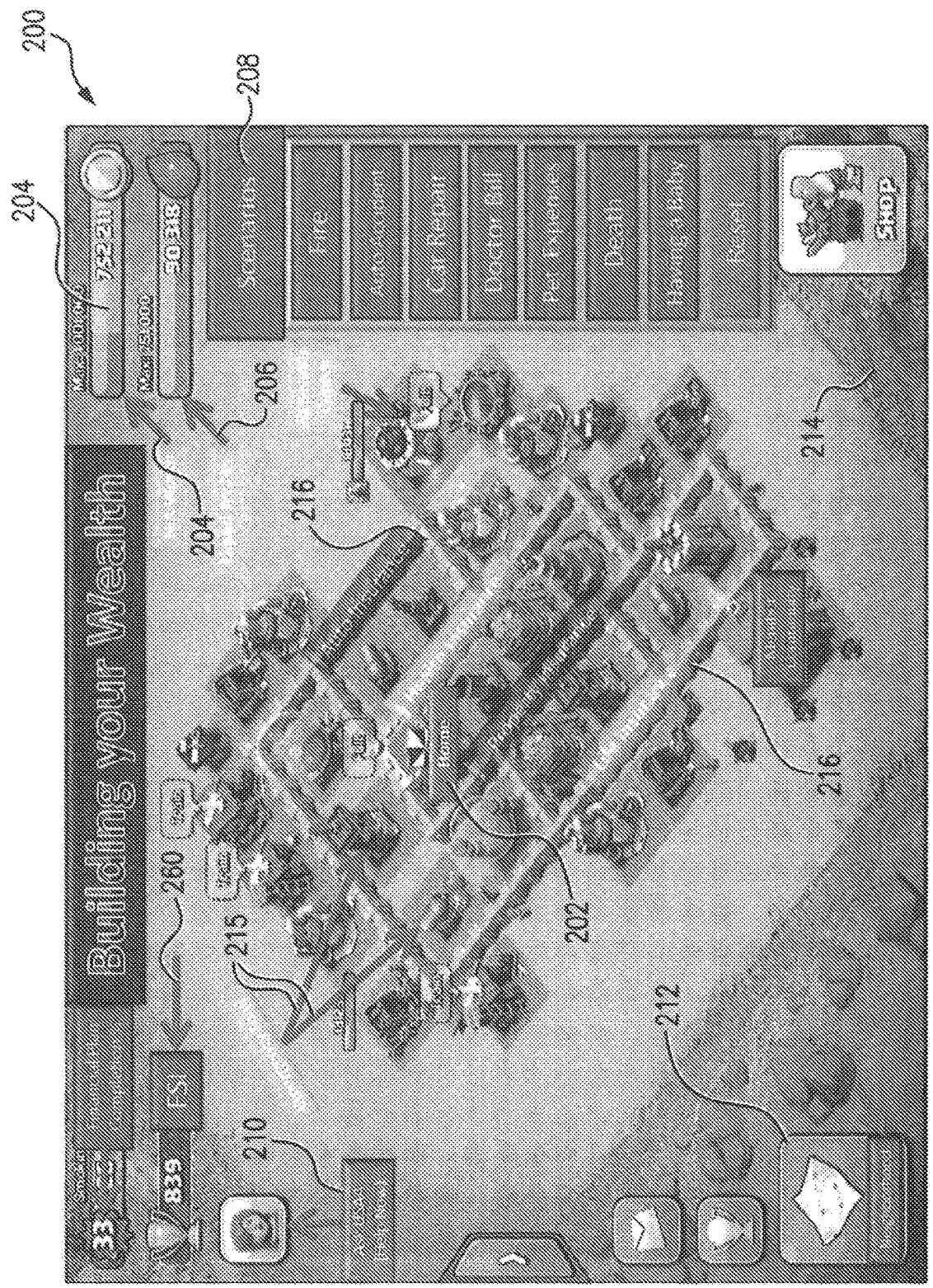
FIGS. 2-3 illustrate exemplary views for gamifying risk management services and displaying a financial status of a user protected by one or more risk management services.
Figure 3:
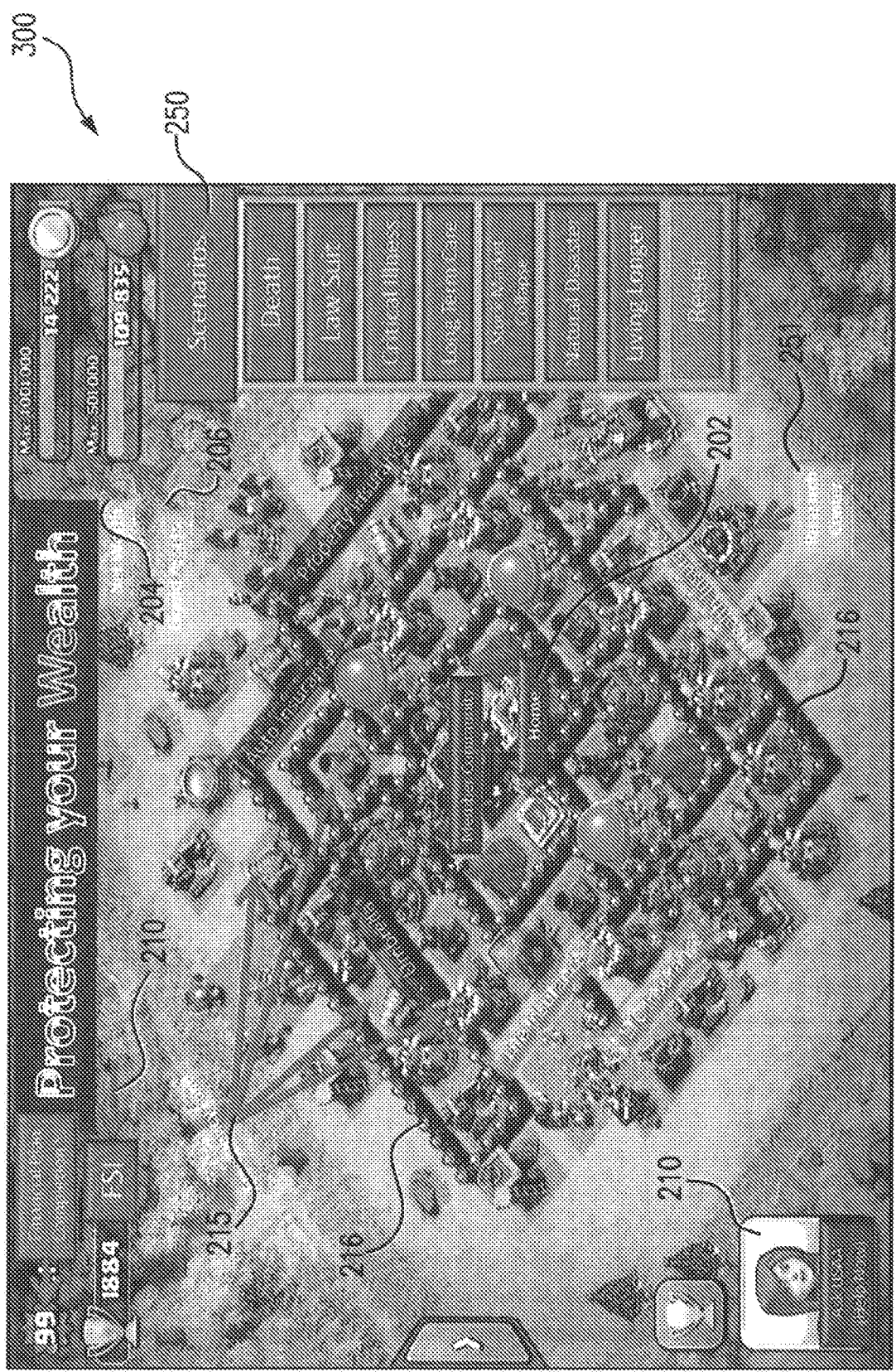

FIG. 2-3 illustrates exemplary views 200 and 300, respectively, for gamifying risk management services and displaying a financial status of a user (e.g., as a financial security fortress) protected by one or more risk management services (e.g., walls, archer towers, guards, etc.).

Referring particularly to FIG. 2, a financial status of the user is represented by a castle "Home" 200 along with various display elements such as status bars "Net Worth" 204 and "Liquid Assets" 206. The risk management environment shown in FIG. 2 further includes a variety of financial impact scenarios 208 (e.g., fire, auto accident, etc.), a research center 251 that can provide education to the user, an interactive chat icon 210 to provide access to risk management professionals, a neighborhood 212 to connect with other risk management service users and a "shop" display element 214 that allows a user to purchase additional risk management services. Notably, the financial status of the user is also visually protected by secured risk management services, shown as walls 216 surrounding the castle. It is to be appreciated that the variety of financial impact scenarios selected may be done via a Monte Carlo simulation engine. As is known to one skilled in the art, such a Monte Carlo simulation engine preferably consists of computational algorithms that rely on repeated random sampling to obtain numerical results to select a particular random financial impact scenario. They are often used in physical and mathematical problems and are most useful when it is difficult or impossible to use other mathematical methods.

FIG. 3 illustrates many of the features shown in FIG. 2 and also highlights additional defensive display elements 250 corresponding to additional risk management services (e.g., auto insurance, property insurance, life insurance, LTC insurance, etc.).

Collectively, the views shown in FIGS. 2-3 visualize the financial status of a user (e.g., as a financial security fortress) accounting for risk management services (e.g., defensive display elements) to gamify securing risk management services and increasing a user's financial status. Such risk management environment facilitates interaction with users and encourages users to increase financial status and protection. The gamified risk management services are easy to use, fun, intuitive, engaging and actionable. Further, the gamified risk management services incorporate education, advice, deepening and social components to move users to action that will improve their financial security. Such risk management services automatically creates a user's fortress based on current products/services the user has and can use FSI 260, their Financial Plan, member entered data or any other reliable way to capture member's financial situation data. In sum, the risk management services allows users to visually see what their current level of financial security is via respective Fortresses, learn about and better understand FSI 260 and how it impacts their financial security, run various financial impact scenarios (e.g., "war game" scenarios) against their current and proposed financial situation, research products and topics relevant to their situation and need, receive advice from risk management service providers at the click of a button and also based on Scenario outcomes. Further, such risk management services allows users to purchase products and services that improve their FSI 260 that have been recommended based on the scenarios and execute financial impact scenarios against the improved financial status/fortress. The risk management environment also connects the community of policy holders and allows users to solicit help from other members, friends, mentors, etc. to help them improve their FSI 260.

Notably, the defensible position display element and defensive display elements—here the fortress and protecting walls, archer stations, etc., are displayed according to the user's assets, liabilities and financial products they have with any risk management service provider. Such display elements are represented based on the value relative to the user's home (which corresponds to the fortress), liquid investments (which corresponds to the money chest), and illiquid investments (which corresponds to a sealed storage container).

As discussed above, member "Support Communities" are also provided to assist in better protecting a user's fortress (e.g., financial status). Additionally, member community are provided to solicit advice from "people like me", member mentors, friends and family A "research lab" 270 also provides educational tools to research various topics/products that could improve a user's FSI 260, and therefore bolster their fortress. Additionally, a user can solicit live discussion by clicking the "Ask USAA" button 210 to reach out to a risk management contact. The "shopping" area 214 allows a user to purchase products and services with an FSI improvement indicator, which highlights relative impact on the user's financial status and/or risk management services (e.g., corresponding to a modified defensible position display element and modified defensive display elements).

With respect to the defensive display elements, risk management services such as insurance products can form initial protections such as walls, structures, or other obstacles that surround and protect the defensible position display element. Such risk management services include, but are not limited to: auto insurance, property insurance, health insurance, umbrella insurance, long term care insurance, and the like. Other defensive display elements 215 (e.g., guards, archer towers, cannons, mortars, etc.) are associated with emergency funds such as money market accounts, savings accounts, etc.

The financial impact scenarios can include a list of scenarios in a pre-populated list for members to select. After selecting any of the financial impact scenarios, game play will iteratively visualize (e.g., via an attack) the potential impact the selected financial impact scenario will have on the defensible position display element and any defensive display elements (e.g., showing damage or reduced states of protection, damage to the fortress, etc.).

After each financial impact scenario is executed against the financial status or the user (and accounting for any secured risk management services), recommendations are provided that mitigates against the financial impact scenario (e.g., bolster the defenses, etc.). Additionally, if the defensible position display element and the defensive display elements are largely unscathed by any financial impact scenario, congratulatory messages are provided to the user as well as a statistical breakdown of what risk management services proved most effective. It is appreciated that the user can reset and rerun any financial impact scenario (including combinations thereof).

It is to be appreciated that an embodiment of the present invention may include a user forming an army for a particular scenario so as to attack a potential event (e.g., an illness), thereby providing an additional level of gameplay in which a user can attack, and not just be attacked. For instance, a user would be able to raise an army based upon their financial assets and go to an "illness fortress" and attack it, whereby if the user's army survives the attack, they would win. And if not, the user's army would be indicated as being defeated and the present invention system would preferably send a message to the user preferably containing information on how to obviate such a losing scenario from happening again (e.g., purchase more life insurance). The present invention may further provide the ability to "level up" in the game whereby a has user the ability to send an attack element to another user (which another user is preferably in the user's predesignated "circle" of users). For example, a user may have a sibling user in their designated user circle who does not have a sufficient amount of life insurance to defend against a successful attack. Thus, once a user has a sufficient amount of "level up" points from preferably playing, that user is then enabled to have the option to send an attack element to another user (e.g., the user's sibling) which another user would then preferably receive notification that his/her fortress was under attack so they can view such an attack scenario.

It is to be further appreciated that alerts and other notifications may be provided to encourage a user to stay involved in the game by either having attacks hit them at regular intervals from the game engine or by having them sent from someone in their circle of designated other users.

Additionally, the present invention may be configured and operational to provide "what-if" scenarios. In one such an example, "what if" a user purchased a vehicle for $40,000 dollars—what resulting effect would that have on the user's fortress? For instance, such a resulting effect may be the fortress walls providing an insurance barrier will downgrade from stone to wood. The present invention system may be further configured and operational to indicate what additional payments and increased insurance (due to vehicle purchase) would do to their savings plan and the effect of the vehicle down payment upon their savings.

FIGS. 4-6 illustrates an example simplified procedures 400-600 for gamifying risk management services, particularly from the perspective of a risk management server (e.g., a processor) and/or a distributed risk management processing system, in accordance with risk management process 144, shown in FIG. 1.

Procedure 400 begins at step 405 and continues to step 410 where the risk management server associates an initial financial status of a user (e.g., a net worth, a total value of assets, a financial stock portfolio value, a bank account value, a mortgage value, a debt value, an emergency fund value, a credit value, etc.) with a defensible position display element in a gameplay scenario (e.g., a house, a building, a structure, a castle, a fortress, a fortified structure, a structure having a size correlating to the financial status of the user, etc.). At step 415, the risk management server receives risk management data regarding at least one initial risk management service (e.g., an insurance service, automobile insurance, vehicle insurance, home owners insurance, rental insurance, an emergency fund, health insurance, life insurance, term insurance, property insurance, umbrella insurance, etc.) secured by the user. Further, at step 420, the risk management server associates the risk management service with at least one defensive display element in the gameplay scenario (e.g., a wall, a bridge, a moat, a barricade, a body of water, an obstacle, and one or more guards, a turret, a defensive weapon, a structure that fortifies and/or protects the defensible position display element, etc.). The risk management server, at step 525 provides the defensible position display element and each defensive display element to a display to cause the display to visualize the defensible position display element protected by each defensive display element in the gameplay scenario.

In certain embodiments, the risk management server, at step 430, evaluates at least one financial impact scenario (e.g., responsive to a request to execute the financial impact scenario, a fire, an auto accident, a car repair, a medical bill, a newborn, a death, a lawsuit, long term care, a natural disaster, etc.) against the initial risk management service and the initial financial status in the gameplay scenario to yield a resultant risk management service and a resultant financial status, respectively. Each of the defensive display elements and the defensible position display element are modified by the resultant risk management service to yield at least one modified defensive display element in the gameplay scenario (step 435) and by the resultant financial status to yield a modified defensible position display element in the gameplay scenario (step 440).

The risk management server provides each modified defensive display element and the modified defensible position display element to the display to cause the display to visualize each modified defensive display element (e.g., in a reduced protection state, in a damaged state, etc.) and the defensible position display element (e.g., in a reduced protection state, in a damaged state, etc.), respectively, in the gameplay scenario at step 445. The procedure 400 subsequently ends at step 450, but may continue on to step 410 where, as discussed above, the risk management server associates an initial financial status of a user with a defensible position display element in a gameplay scenario.

Procedure 500 begins at step 505 and continues to step 510 where (like procedure 400) the risk management server associates an initial financial status of a user with a defensible position display element in a gameplay scenario. The risk management server further receives risks management data regarding at least one initial risk management service secured by the user (step 515), associates the risk management service with at least one defensive display element in the gameplay scenario (step 520), and evaluates at least one financial impact scenario against the initial risk management service and the initial financial status in the gameplay scenario to yield a resultant risk management service and a resultant financial status, respectively (step 525).

According to procedure 500, the risk management server further determines, at step 530, a risk management change between the initial risk management service and the resultant risk management service and a financial status change (step 535) between the initial financial status and the resultant financial status. The risk management server further associates the risk management change and the financial status change with a game play time period at step 540 and iteratively, at steps 545-550, modifies each defensive position display element by the risk management change according to the game play time period and the defensible position display element by the financial status change according to the game play time period (e.g., visualize an attack). As with procedure 400, the risk management server provides, at step 555, the defensible position display element and each defensive display element to a display to cause the display to visualize the defensible position display element protected by each defensive display element in the gameplay scenario.

Procedure 500 subsequently ends at step 560, but may continue on to step 510 where, as discussed above, the risk management server associates an initial financial status of a user with a defensible position display element in a gameplay scenario.

Procedure 600 begins at step 605 and continues to step 610 where, as discussed above with respect to procedures 400-500, the risk management server associates an initial financial status of a user with a defensible position display element in a gameplay scenario. Likewise, steps 615-625 highlight the process by which the risk management server receives risk management data regarding at least one initial risk management service secured by the user (step 615), associates the risk management service with at least one defensive display element in the gameplay scenario (step 620), and provides the defensible position display element and each defensive display element to a display to cause the display to visualize the defensible position display element protected by each defensive display element in the gameplay scenario (step 625).

According to procedure 600, risk management server receives, at step 630, a request to execute at least one financial impact scenario in the gameplay scenario. The risk management server further determines modifications to at least one of the defensible position display element and the defensive display element responsive to the financial impact scenario at step 635, and provides, at step 640, the modifications to the display to cause the display to visualize an attack on the at least the one of the defensible position display element and the defensive display element and visualize the modifications to the at least one of the defensible position display element and the defensive display element responsive to the attack.

Procedure 600 subsequently ends at step 645, but may continue on again to step 610 where the risk management server associates an initial financial status of a user with a defensible position display element in a gameplay scenario It should be noted that while certain steps within procedures 400-600 may be optional, the steps shown in FIGS. 4-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 400-600 are described separately, certain steps from each procedure may be incorporated into each other procedure, and the procedures are not meant to be mutually exclusive.

The techniques described herein, therefore, provide an interactive, dynamic and engaging risk management services environment that gamifies providing risk management services to users. In particular, the risk management techniques described above provide advice, protection, and financial planning (e.g., banking and investments) that are customizable for each individual user. In particular, the techniques herein provide entertaining and relatable techniques that educate users regarding financial impact scenarios and potential impact such scenarios can have on the user's financial status as well as account for any secured or prospective risk management policies.

While there have been shown and described illustrative embodiments that gamify providing risk management services, it is to be understood that various other adaptations and modifications may be made within the spirit and scope of the embodiments herein. For example, the embodiments have been shown and described herein with relation to particular display elements; however, the embodiments in their broader sense are not limited to such display elements but can encompass a variety of display elements. For instance, the present invention may also include a timeline component configured and operational to enable a user to play in a "round by round" format that takes them to their retirement years and eventual death.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for providing a Graphical User Interface (GUI) for gamifying risk management services, the method comprising:
   associating, by a processor, a financial status of a user with a defensible position display element in a gameplay scenario;
   associating, by the processor, a risk management service with at least one defensive display element in the gameplay scenario;
   displaying, by the processor, the defensible position display element and each defensive display element on the GUI;
   visualizing, by the processor, the defensible position display element protected by each defensive display element in the gameplay scenario;
   receiving, by the processor, a request to execute a financial impact scenario, where the financial impact scenario include a fire, an auto accident, a car repair, a medical bill, a death, a lawsuit, long term care and natural disaster;
   evaluating, by the processor, at least one financial impact scenario using a Monte Carlo simulation engine against the risk management service and the financial status in the gameplay scenario yielding a resultant risk management service and a resultant financial status, respectively and modifying, by the processor, each defensive display element by the resultant risk management service yielding at least one modified defensive display element in the gameplay scenario displayed on the GUI;
   executing, by the processor, the financial impact scenario in the gameplay scenario; determining, by the processor, modifications to the at least one defensive display element responsive to the financial impact scenario;
   visualizing and displaying, by the processor, the modified defensive display element in the gameplay scenario and the resulting impact upon the corresponding protected defensible position display element caused by the financial impact scenario dynamically;
   determining, by the processor, modification actions that mitigate the financial impact scenario; and
   modifying, by the processor, the GUI display and visualizing an attack on the defensible position display element and visualizing modifications to the at least the one of the defensible position display element and the defensive display element responsive to the attack; and displaying mitigation against financial impact scenario with indication that the defensive element being protected with the modification actions.

2. The method of claim 1, further including executing, by the processor, at least one asset purchase scenario by the user in the gameplay scenario including determining and providing modifications to at least one of the defensible position display element and the defensive display element displayed on the GUI resulting from the at least one asset purchase.

3. The method of claim 1, further including determining, and providing indication on the GUI a financial impact to the user resulting from the at least one asset purchase.

4. The method of claim 1, further including generating, by the processor, the defensible position display element on the GUI wherein the visual size of the defensible position display element is proportional to the financial status of the user.

5. The method of claim 4, further including generating the at least one defensive display element on the GUI wherein the visual size of the at least one defensive display element is proportional to a risk mitigation value.

6. The method of claim 1, wherein the financial status of the user is an initial financial status and wherein the risk management service is an initial risk management service.

7. The method of claim 1, further including modifying the display to visualize an attack on the at least the one of the defensible position display element and the defensive display element and visualize the modifications to the at least one of the defensible position display element and the defensive display element responsive to the attack to display mitigation of the financial impact scenario.

8. The method of claim 1, wherein the risk management data comprises risk management data regarding a plurality of risk management services secured by the user, and wherein, associating the risk management service with at least one defensive display element comprises, associating, by the processor each risk management service with a corresponding defensive display element.

9. The method of claim 1, wherein the risk management service comprises an insurance service.

10. The method of claim 1, wherein the risk management service comprises automobile insurance, vehicle insurance, home owners insurance, rental insurance, an emergency fund, health insurance, life insurance, term insurance, property insurance, and umbrella insurance.

11. The method of claim 1, wherein the financial status of the user comprises at least one of a net worth, a total value of assets, a financial stock portfolio value, a bank account value, a mortgage value, a debt value, an emergency fund value, and a credit value.

12. The method of claim 1, wherein the defensible position display element comprises at least one of a house, a building, and a structure.

13. The method of claim 1, wherein the at least one defensive display element comprises at least one of a wall, a bridge, a moat, a barricade, a body of water, an obstacle, and one or more guards.

14. The method of claim 1, wherein the defensible position display element comprises a structure having a size correlating to the financial status of the user.

15. The method of claim 1, wherein, providing each modified defensive display element to the display comprises providing each modified defensive display element to the display to cause the display to visualize each defensive display element in a reduced protection state in the gameplay scenario.

16. The method of claim 1, wherein, providing the modified defensible position display element to the display comprises providing the modified defensible position to the display to cause the display to visualize the defensible position display element in a damaged state in the gameplay scenario.

* * * * *